(12) United States Patent
Beitzel et al.

(10) Patent No.: US 6,364,778 B1
(45) Date of Patent: Apr. 2, 2002

(54) AXIALLY ADJUSTABLE STEERING SHAFT ASSEMBLY WITH BALL SPLINE

(75) Inventors: Daniel E. Beitzel, Perrysburg; Albert Aiken, Toledo; Blake T. Garretson, Liberty Center, all of OH (US)

(73) Assignee: Spicer Driveshaft, Inc., Holland, OH (US)

( * ) Notice: Subject to any disclaimer, the term of this patent is extended or adjusted under 35 U.S.C. 154(b) by 0 days.

(21) Appl. No.: 09/578,365

(22) Filed: May 25, 2000

(51) Int. Cl.[7] .................................................. F16C 3/03
(52) U.S. Cl. ........................ 464/168; 464/165; 464/167; 74/493
(58) Field of Search .............................. 464/167, 168, 464/165; 74/492, 493; 280/263

(56) References Cited

U.S. PATENT DOCUMENTS

| | | | |
|---|---|---|---|
| 3,136,142 A | | 6/1964 | Zeidler |
| 3,304,745 A | | 2/1967 | King et al. |
| 3,356,424 A | | 12/1967 | Edwards |
| 3,360,308 A | | 12/1967 | Grabowski et al. |
| 3,552,806 A | | 1/1971 | Weasler et al. |
| 3,800,558 A | * | 4/1974 | Buthe et al. ............. 464/168 |
| 3,995,916 A | | 12/1976 | Lange et al. |
| 4,133,190 A | * | 1/1979 | Schuller ................... 464/168 |
| 4,384,861 A | | 5/1983 | Lange et al. |
| 4,774,851 A | | 10/1988 | Iwanami et al. |
| 5,520,416 A | | 5/1996 | Singer, III et al. |
| 5,737,971 A | | 4/1998 | Riefe et al. |
| 5,911,789 A | | 6/1999 | Keipert et al. |

FOREIGN PATENT DOCUMENTS

| | | |
|---|---|---|
| GB | 911077 | 11/1962 |
| GB | 1250746 | 10/1971 |
| GB | 2203804 | 10/1988 |
| GB | 2308583 | 7/1997 |

\* cited by examiner

*Primary Examiner*—Lynne H. Browne
*Assistant Examiner*—Aaron Dunwoody
(74) *Attorney, Agent, or Firm*—MacMillan. Sobanski & Todd, LLC

(57) ABSTRACT

A steering shaft assembly for a vehicle uses a ball spline as a slip member. In general, the slip member includes an outer race member, an inner race member, and a pair of end return members. The outer race member includes one or more grooves or recesses, each groove forming an outer race. The inner race member includes a corresponding number of grooves and inner bores to form an outer race track and inner race tracks, respectively. Each outer race and corresponding outer race track form an outer ball recirculating track for transmitting torque through the recirculating ball bearings. Each inner race track forms an inner ball recirculating track for providing a circumferential path for the ball bearings. In one embodiment, the inner race member and end return members are generally cylindrical in cross sectional shape that is disposed within the outer race member. The outer race member, inner race member and end return member can be any desired cross sectional shape. For example, the inner race member and return end members can include one or more projections extending outwardly to the outer race member. The slip member can be used a steering shaft assembly that is in production by forming grooves in the outer race member to form the outer races and inserting ball recirculating track members within a corresponding number of slots formed in an existing yoke tube.

23 Claims, 11 Drawing Sheets

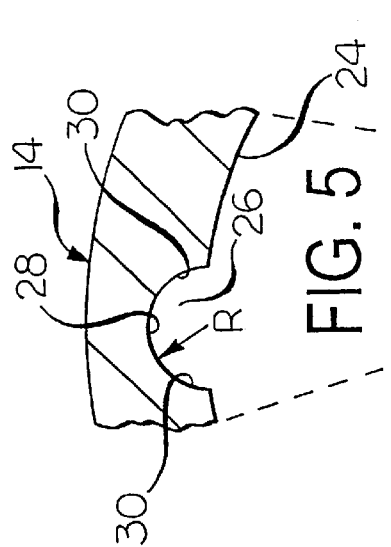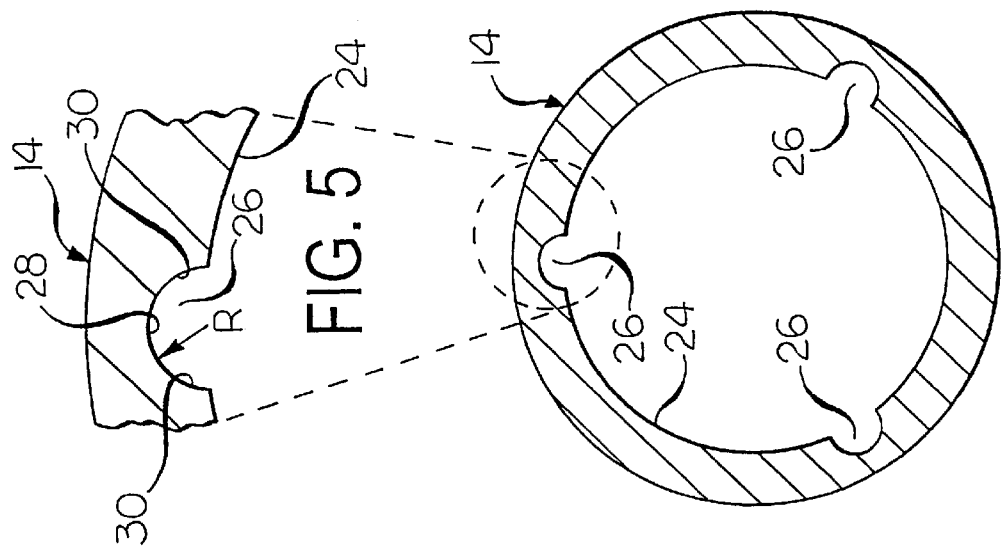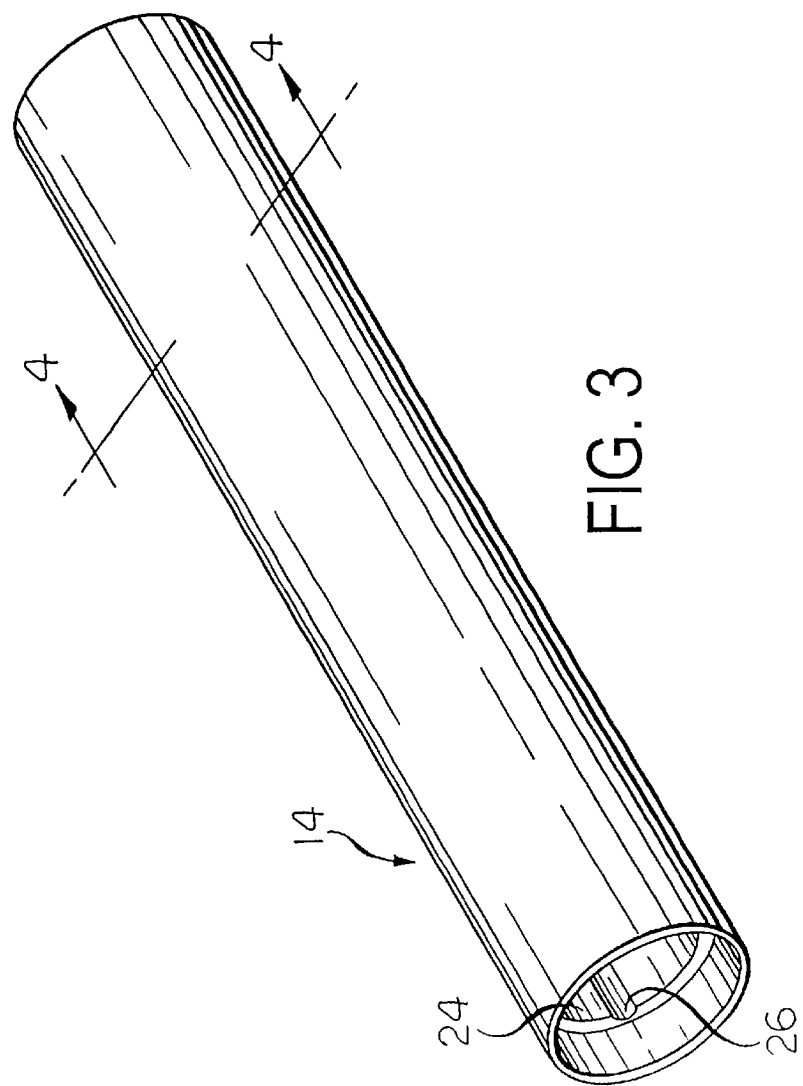

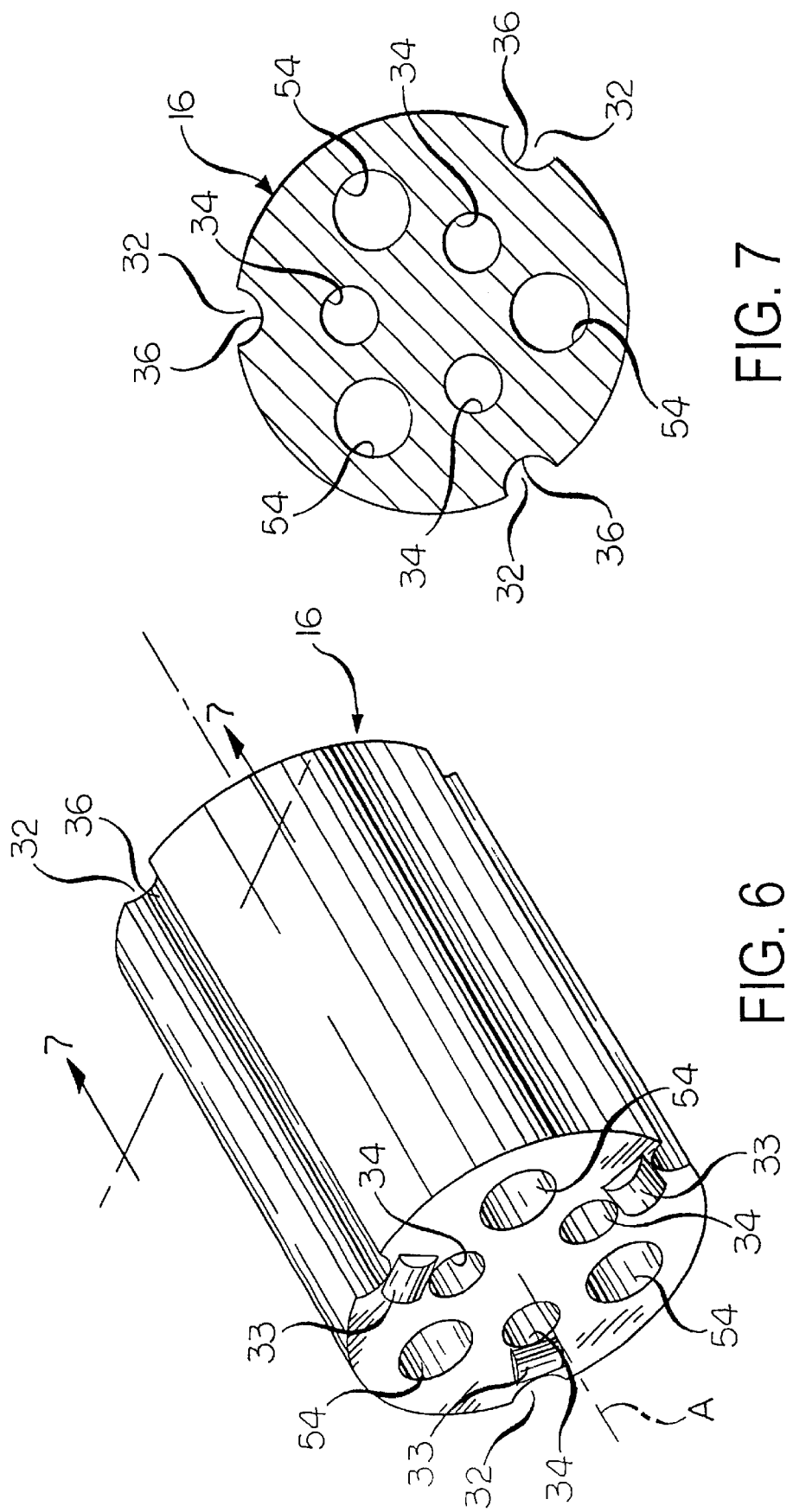

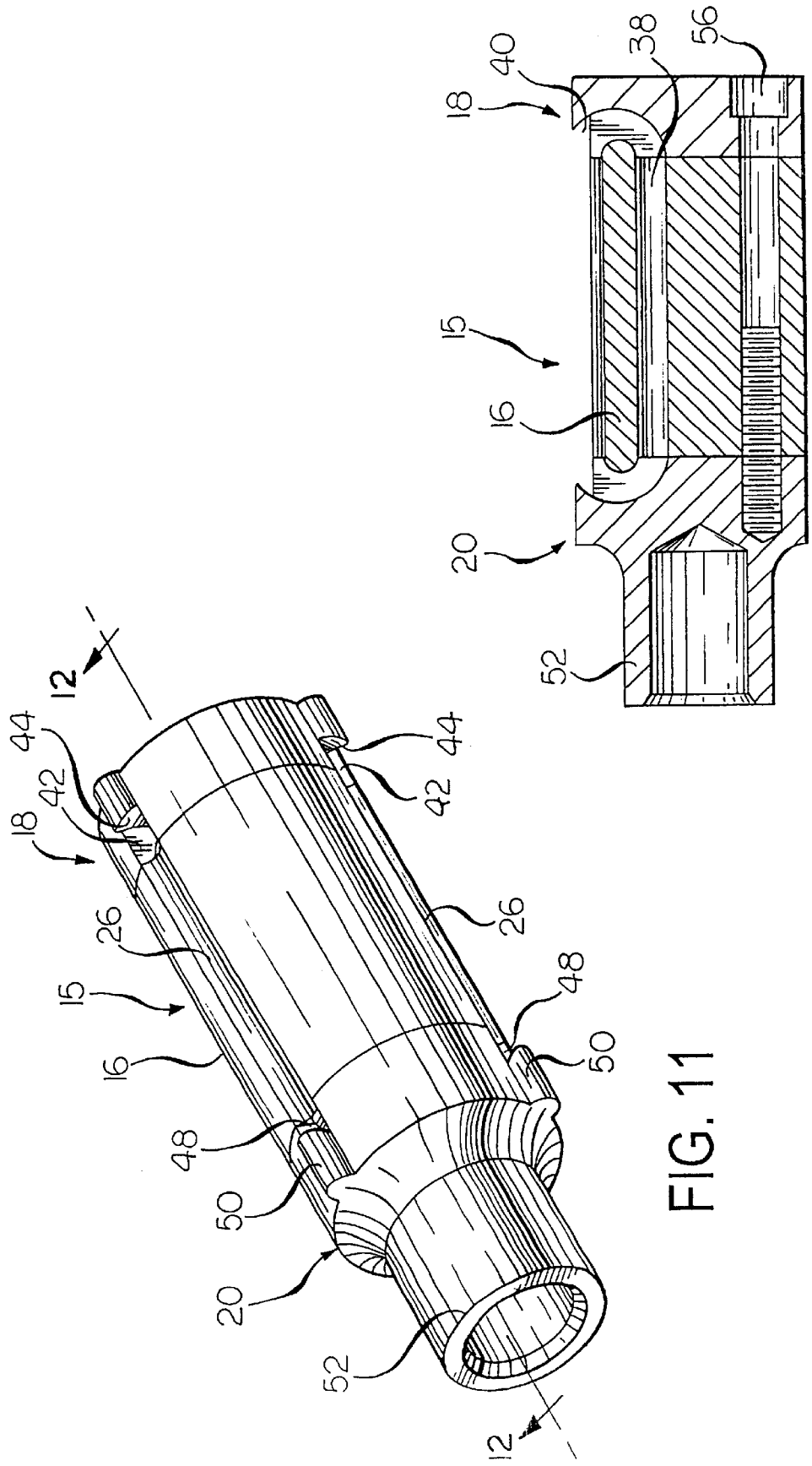

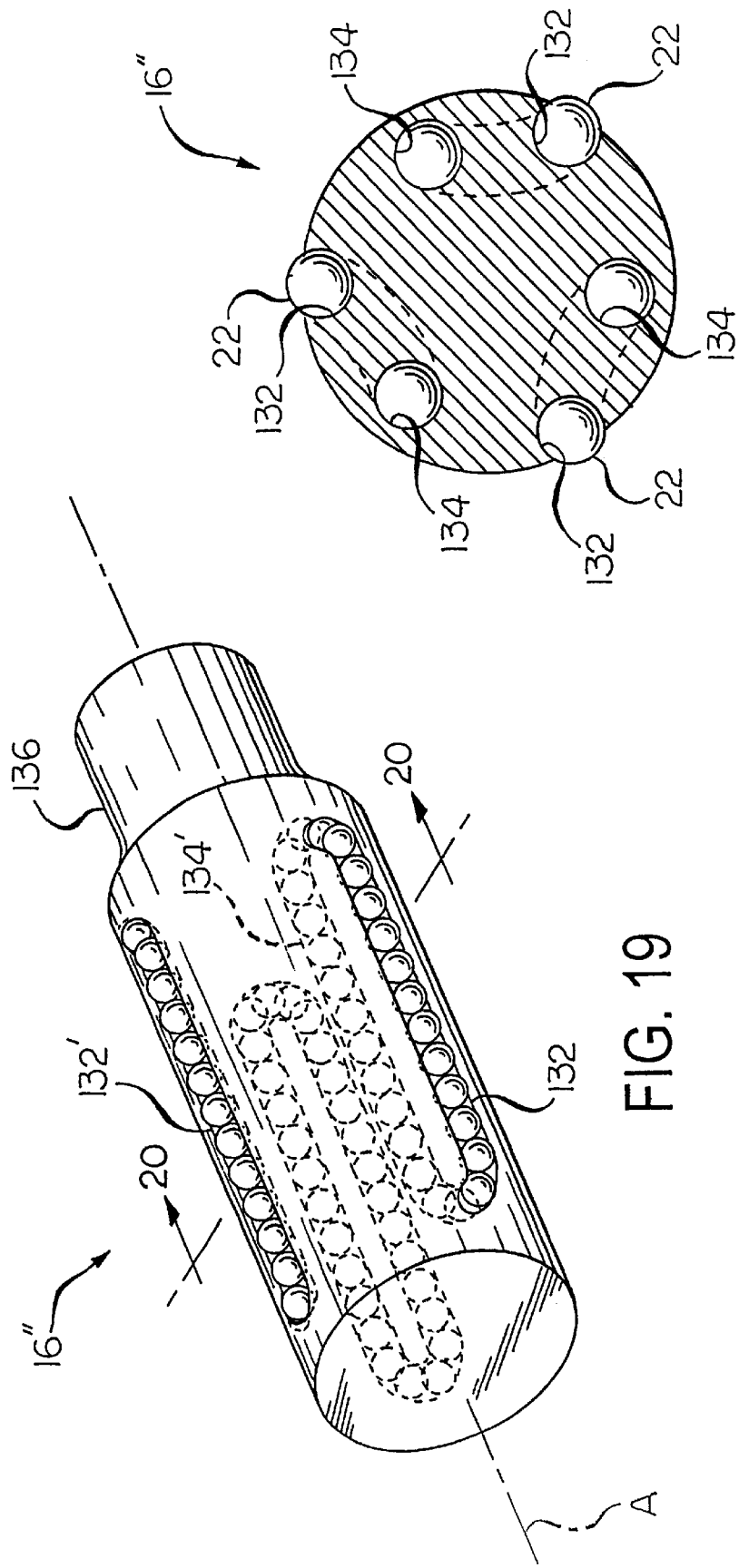

AXIALLY ADJUSTABLE STEERING SHAFT ASSEMBLY WITH BALL SPLINE

BACKGROUND OF THE INVENTION

This invention relates in general to a rotational driving and steering shaft assembly. More specifically, this invention relates to a steering shaft assembly using a ball spline as a slip member.

In virtually every vehicle in use today, a steering system is provided for permitting a driver to control the direction of movement. A typical steering system includes a steering wheel, a steering shaft assembly, and a steering device. The steering wheel is rotatably supported within a driver compartment of the vehicle for movement by a driver. The steering shaft assembly is connected at one end to the steering wheel for rotation therewith. The other end of the steering shaft assembly is connected to the steering device for turning the wheels of the vehicle in response to rotation of the steering wheel. In its simplest form, the steering shaft assembly is embodied as a single shaft or tube having a pair of yokes mounted on the ends thereof. The yokes are usually connected by respective universal joints to the steering wheel and the steering device.

In many larger vehicles, such as trucks, the steering shaft assembly is designed not only to provide a rotational driving connection between the steering wheel and the steering device, but also to permit relative axial movement to occur therebetween. Such relative axial movement is advantageous for two reasons. First, a relatively small amount of such relative axial movement is desirable to accommodate vibrations, bumps, and other aspects of normal vehicle operation that would otherwise be transmitted from the steering device through the steering shaft assembly to the steering wheel. Second, when the vehicle is serviced, a relatively large amount of such relative axial movement is desirable to permit the cab of the vehicle to be pivoted upwardly without requiring disassembly of the steering system.

To accomplish this, it is known to construct the steering shaft assembly from cooperating male and female splined telescoping steering shafts. The first steering shaft is connected to the steering wheel by a first universal joint, while the second steering shaft is connected to the steering device by a second universal joint. The universal joints are provided to permit angular articulation between the steering shafts and the associated steering wheel and the steering device. The splined connection between the first and second steering shafts provides a rotatable driving connection between the steering wheel and the steering device, while permitting relative axial movement therebetween.

In the past, one or both of the splined members were coated with a material having a relatively low coefficient of friction. The low friction coating was provided to minimize the amount of force required to effect relative movement between the two splined members. Also, the low friction coating provided a relatively tight fit between the cooperating splines of the two splined members, thus minimizing any undesirable looseness therebetween while continuing to allow free axial movement.

One problem that has been experienced in connection with slip members manufactured according to known methods is that an undesirably large gap can still exist between adjacent splines formed on the cooperating members of the slip member even after the coating has been applied. These relatively large gaps can occur as a result of manufacturing tolerances in the formation of the individual splined members and the coating process and usually result in an undesirable amount of looseness between the splined members during operation. Looseness that occurs in the direction of rotation of the splined members, wherein one of the splined members can rotate relative to the other splined member, is referred to as backlash. Looseness that occurs in the direction transverse to the axis of rotation of the slip member, wherein one of the splined member can extend at a cantilevered angle relative to the other splined member, is referred to as broken back. Known solutions to the problems of backlash and broken back have been found to be relatively difficult, costly, and time consuming to employ. Thus, it would be desirable to provide an improved slip member that results in precise conformance between the telescoping members, thus, minimizing the adverse effects of backlash and broken back.

SUMMARY OF THE INVENTION

This invention relates to a slip member for a steering shaft assembly. In one aspect of the invention, a slip member comprises an outer race member including one or more race tracks and an inner race member capable of being disposed within the outer race member. The inner race member includes a core member having one or more inner and outer race tracks corresponding in number to the one or more race tracks of the outer race member. The inner race member also includes a first end return member coupled to one end of the inner race member. The first end return member includes a recess defining a first end return track for allowing one or more ball bearings to recirculate between the outer race member and the inner race member. The inner race member also includes a second end return member coupled to the other end of the inner race member. The second end return member includes a recess defining a second end return track for allowing one or more ball bearings to recirculate between the outer race member and the inner race member. The one or more tracks of the outer race member radially aligns with the corresponding outer race track of the inner race member to define an outer ball recirculating track for transmitting torque between the outer race member and the inner race member through the one or more ball bearings. The one or more inner tracks of the inner race member defines an inner ball recirculating track for allowing the one or more ball bearings to freely travel between the inner ball recirculating track and the outer ball recirculating track.

In another aspect of the invention, a slip member comprises an outer race member including one or more race tracks, a yoke tube having at least one slot formed therein, a pair of ball recirculating track members disposed within the at least one slot, each ball recirculating track member including one or more recesses, the recesses forming an outer ball recirculating race track, an inner ball recirculating race track, and first and second end return race tracks; and one or more ball bearings disposed within one or the outer and inner ball recirculating race tracks.

In yet another aspect of the invention, a steering shaft assembly for a vehicle comprises a slip joint including an outer race member including one or more race tracks and an inner race member capable of being disposed within the outer race member. The inner race member includes a core member having one or more inner and outer race tracks corresponding in number to the one or more race tracks of the outer race member. The inner race member also includes a first end return member coupled to one end of the inner race member. The first end return member includes a recess defining a first end return track for allowing one or more ball bearings to recirculate between the outer race member and the inner race member. The inner race member also includes a second end return member coupled to the other end of the inner race member. The second end return member includes a recess defining a second end return track for allowing one or more ball bearings to recirculate between the outer race member and the inner race member. The one or more tracks of the outer race member radially aligns with the corresponding outer race track of the inner race member to define an outer ball recirculating track for transmitting torque between the outer race member and the inner race member through the one or more ball bearings. The one or more inner tracks of the inner race member defines an inner ball recirculating track for allowing the one or more ball bearings to freely travel between the inner ball recirculating track and the outer ball recirculating track. The second end return member including a shaft extending therefrom. A first yoke is secured to the shaft of the second end return member and the outer race member, and a second yoke secured to a yoke tube. The one or more tracks of the outer race member and the corresponding outer race track of the core member define an outer ball recirculating track for transmitting torque between the outer race member and the inner race member through the one or more ball bearings. The one or more inner tracks of the inner race member defines an inner ball recirculating track for allowing the one or more ball bearings to freely travel between the inner ball recirculating track and the outer ball recirculating track.

In yet another aspect of the invention, a steering shaft assembly for a vehicle comprises a slip joint including an outer race member including one or more race tracks, a yoke tube having at least one slot formed therein, a pair of ball recirculating track members disposed within the at least one slot, each ball recirculating track member including one or more recesses, the recesses forming an outer ball recirculating race track, an inner ball recirculating race track, and first and second end return race tracks, and one or more ball bearings disposed within one or the outer and inner ball recirculating race tracks. A first yoke is secured to the shaft of the outer race member and a second yoke secured to the yoke tube.

Various objects and advantages of this invention will become apparent to those skilled in the art from the following detailed description of the preferred embodiments, when read in light of the accompanying drawings.

BRIEF DESCRIPTION OF THE DRAWINGS

FIG. 3 is a perspective view of the outer race member according to the invention.

FIG. 4 is a cross sectional view of the outer race member taken along line 4—4 of FIG. 3.

FIG. 5 is an enlarged view of one of the race tracks of the outer race member of FIGS. 3 and 4.

FIG. 6 is a perspective view of the core member according to the invention.

FIG. 7 is a cross sectional view of the core member taken along line 7—7 of FIG. 6.

FIG. 11 is a perspective view of the inner race member formed by the assembly of the core member illustrated in FIGS. 6 and 7, the first return end member illustrated in FIGS. 8 and 9, and the second return end member illustrated in FIG. 10.

FIG. 12 is a cross sectional view of the assembled inner race member taken along line 12—12 of FIG. 11.

FIG. 19 is a perspective in cross section of a third alternate embodiment of a slip joint of the invention.

FIG. 20 is an enlarged cross sectional view of the third alternative embodiment of the slip joint of FIG. 19.

DETAILED DESCRIPTION OF THE PREFERRED EMBODIMENTS

Figure 1:
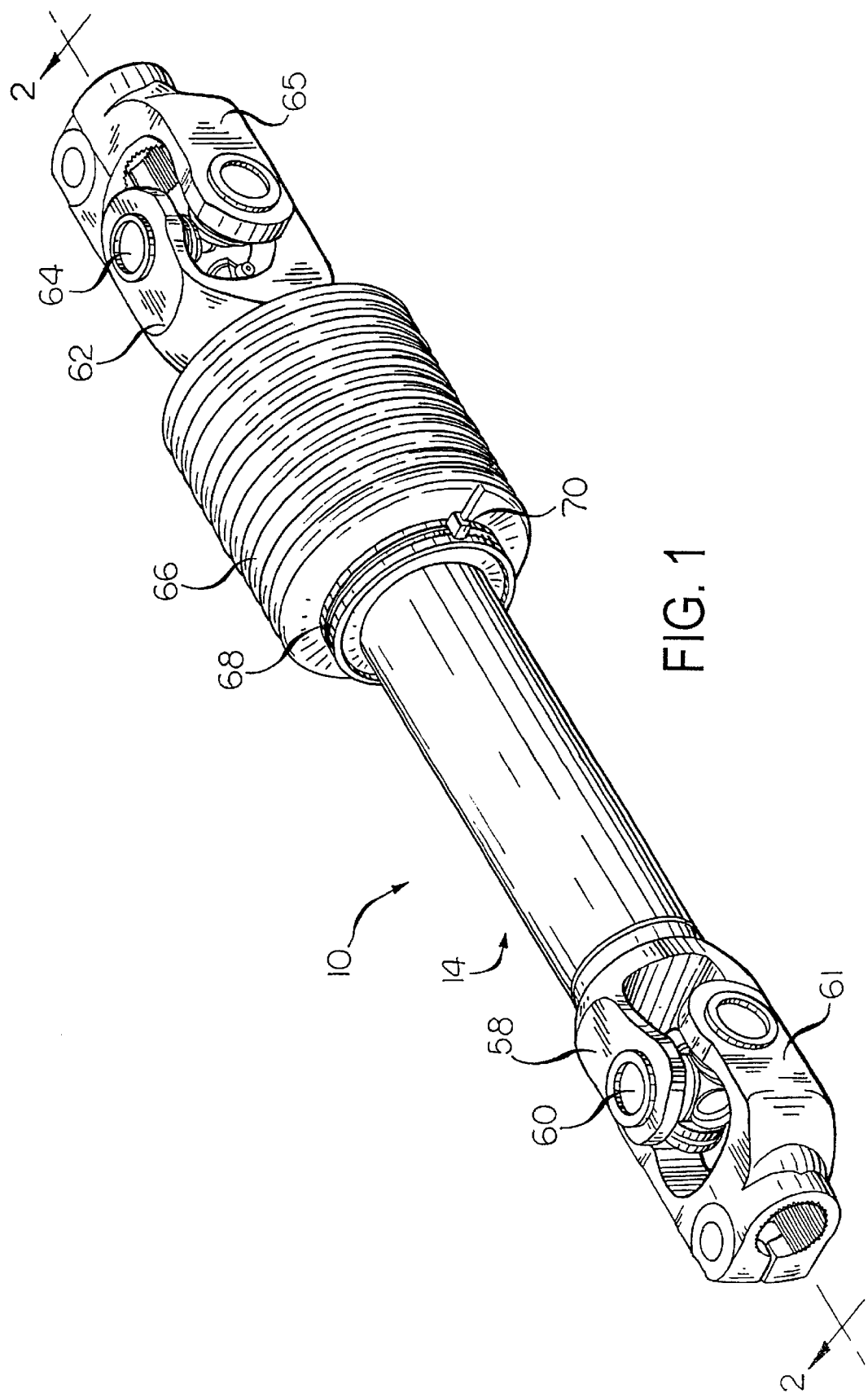
FIG. 1 is a perspective view of a steering shaft assembly including a slip member according to the invention.
Figure 2:
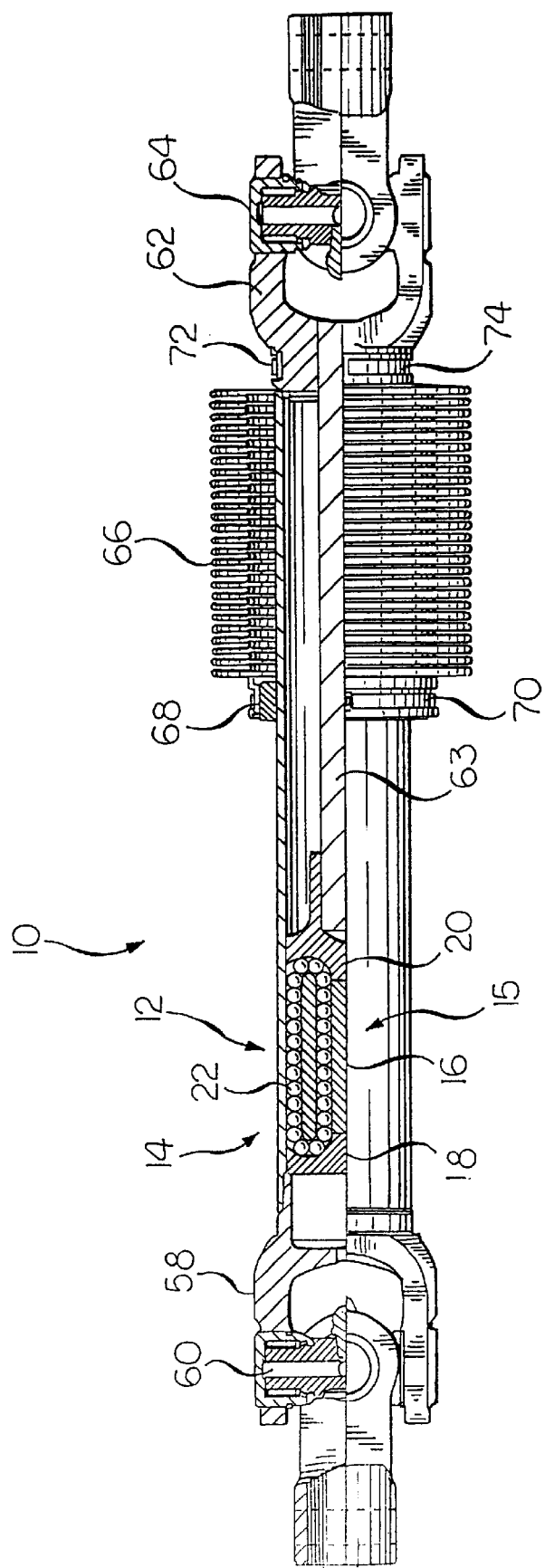
FIG. 2 is a cross sectional view, partially in elevation, of the steering shaft assembly taken along line 2—2 of FIG. 1.

Referring now to the drawings, there is illustrated in FIGS. 1 and 2 a steering shaft assembly, indicated generally at 10, in accordance with this invention. Although this invention will be described and illustrated in the context of a vehicular steering shaft assembly 10 as shown, it will be appreciated that this invention can be used in conjunction with any application or any structure that provides a rotational driving connection between a first component and a second component, while permitting relative axial movement therebetween.

The steering shaft assembly 10 includes a ball spline as a slip member, indicated generally at 12, comprising an outer race member 14, an inner race member 15, and a plurality of ball bearings 22. The inner race member 15 comprises a core member 16 disposed between a first return end member 18 and a second return end member 20. The inner diameter of the outer race member 14 is slightly larger than the outer diameters of the core member 16 and of the first and second return end members 18 and 20 to allow the inner race member 15 to be disposed within the outer race member 14 with clearance.

Referring now to FIGS. 3–5, the outer race member 14 is preferably comprised of a hollow tube member having an inside surface 24 that includes one or more grooves or recesses defining race tracks 26 for the ball bearings 22. Preferably, the race tracks 26 are semi-circular shaped having a radius, R, that is slightly larger than the radius of ball bearings 22 to allow the ball bearings 22 to engage the bottom 28 of the race track 26 when the outer race member 14 is moved axially relative to the core is member 16.

As best shown in FIG. 4, the outer race member 14 includes three race tracks 26 offset from each other by approximately 120°. However, it will be appreciated that the invention is not limited by the number of race tracks 26, and that the invention can be practiced with any desired number of race tracks 26 defined by the outer race member 14. For example, the outer race member 14 can include four race tracks 26 offset from each other by approximately 90°. In another example, the outer race member 14 can include five race tracks 26 offset from each other by approximately 72°.

It will also be appreciated that the invention is not limited by the cross-sectional shape of the race tracks 26, and that the invention can be practiced with the race tracks 26 having any desired cross-sectional shape. For example, the race tracks 26 can have an oval or elliptical cross-sectional shape such that the ball bearings 22 do not engage the bottom 28 of the race track 26 as in the semi-circular shaped race track, but rather engage the opposed sides 30 of the race track 26.

Referring now to FIGS. 6 and 7, the core member 16 includes one or more outer race tracks 32 and a corresponding number of radially aligned inner bores or inner race tracks 34. The inner race tracks 34 are of sufficient diameter to allow the ball bearings 22 to recirculate as the slip member 12 is moved axially, thereby defining an inner ball recirculating track 38 (FIG. 12) of the slip member 12. Preferably, the inner and outer race tracks 32 and 34 are complementary in cross-sectional shape with the race track 26 of the outer race member 14 such that the ball bearings 22 simultaneously engage the bottom 28 of the race track 26 of the outer race member 14 and the bottom 36 of the outer race track 32 of the core member 16, thereby defining an outer ball recirculating track 40 (FIG. 12) of the slip member 12. The core member 16 also includes one or more ramps 33 on each end (only one end is shown in FIG. 6) of the core member 16. The ramps 33 facilitate the recirculation of the ball bearings 22 between the outer and inner race tracks 32 and 34. Similar to the race track 26 of the outer race member 14, the outer and inner race tracks 32 and 34 of the core member 16 can be any desired cross sectional shape, rather than semi-circular shaped. For example, the outer and inner race tracks 32 and 34 can be oval-shaped, elliptical-shaped, and the like. A plurality (three in the illustrated embodiment) of through bores 54 are formed through the core member 16 for a purpose that will be explained below.

Preferably, the outer and inner race tracks 32 and 34 of the core member 16 are radially aligned with respect to a rotational axis, A, of the core member 16. In other words, the inner race track 34 is offset by 0° from the load bearing outer race track 32 such that the ball bearings 22 transmit torque between the outer and inner race members 14 and 15. By contrast, the ball bearings 22 while traveling on the inner race tracks 34 do not transmit any torque between the outer and inner race members 14 and 15, but are able to freely move within the inner race tracks 34. Preferably, the load bearing portions of the outer and inner race tracks 32 and 34 are made of hardened metal. However, the non-load bearing portions of the inner race track 34 can be made of a different material, such as softer metal or thermoplastic material.

Figure 9:
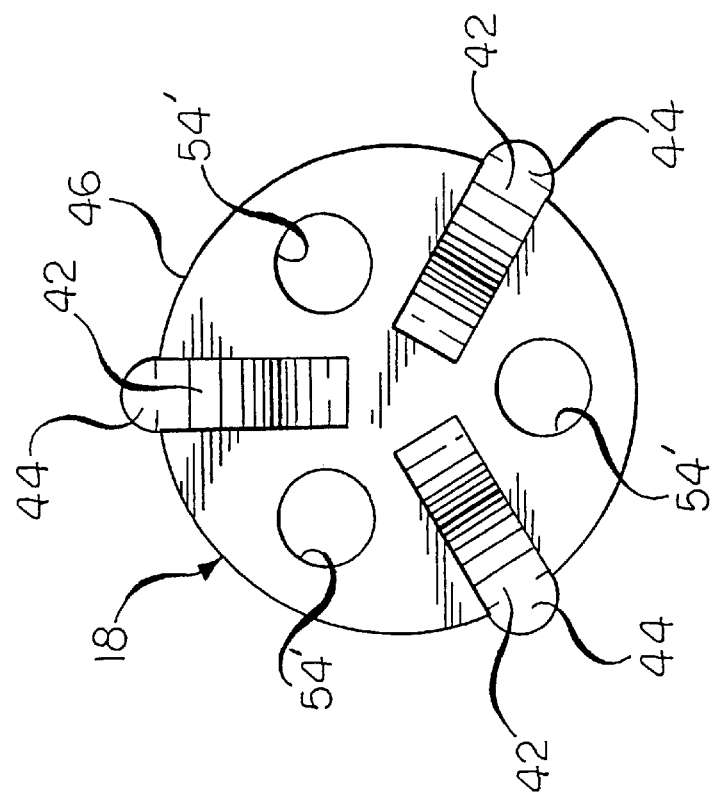
FIG. 9 is an end elevational view of the first return end member of FIG. 8.
Figure 8:
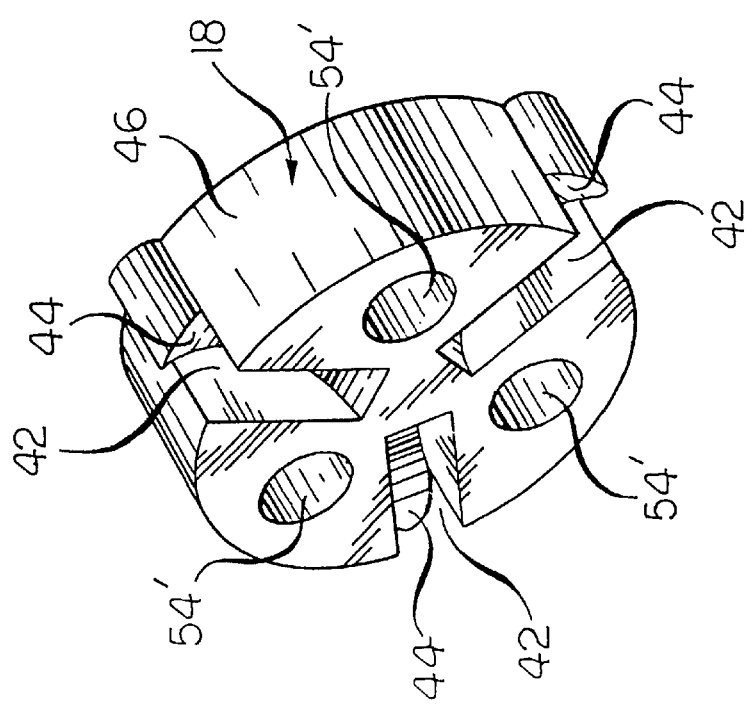
FIG. 8 is a perspective view of the first return end member according to the invention.

Referring now to FIGS. 8 and 9, the first return end member 18 is generally cylindrical shaped having an outer diameter approximately equal to the outer diameter of the core member 16. The first return end member 18 includes one or more recesses or return race tracks 42 that correspond in number to the number of outer and inner race tracks 32 and 34 of the core member 16. Preferably, the return race tracks 42 are complementary in position and cross sectional shape with the race tracks 26 of the outer race member 14 and with the outer and inner race tracks 32 and 34 of the core member 16. Each return race track 42 includes a concave end portion 44 that protrudes from the outer surface 46 of the first return end member 18 to facilitate the circumferential travel or recirculation of the ball bearings 22 around the outer and inner race tracks 32 and 34 of the core member 16.

A plurality (three in the illustrated embodiment) of through bores 54' are formed through the first return end member 18 for a purpose that will be explained below.

Figure 10:
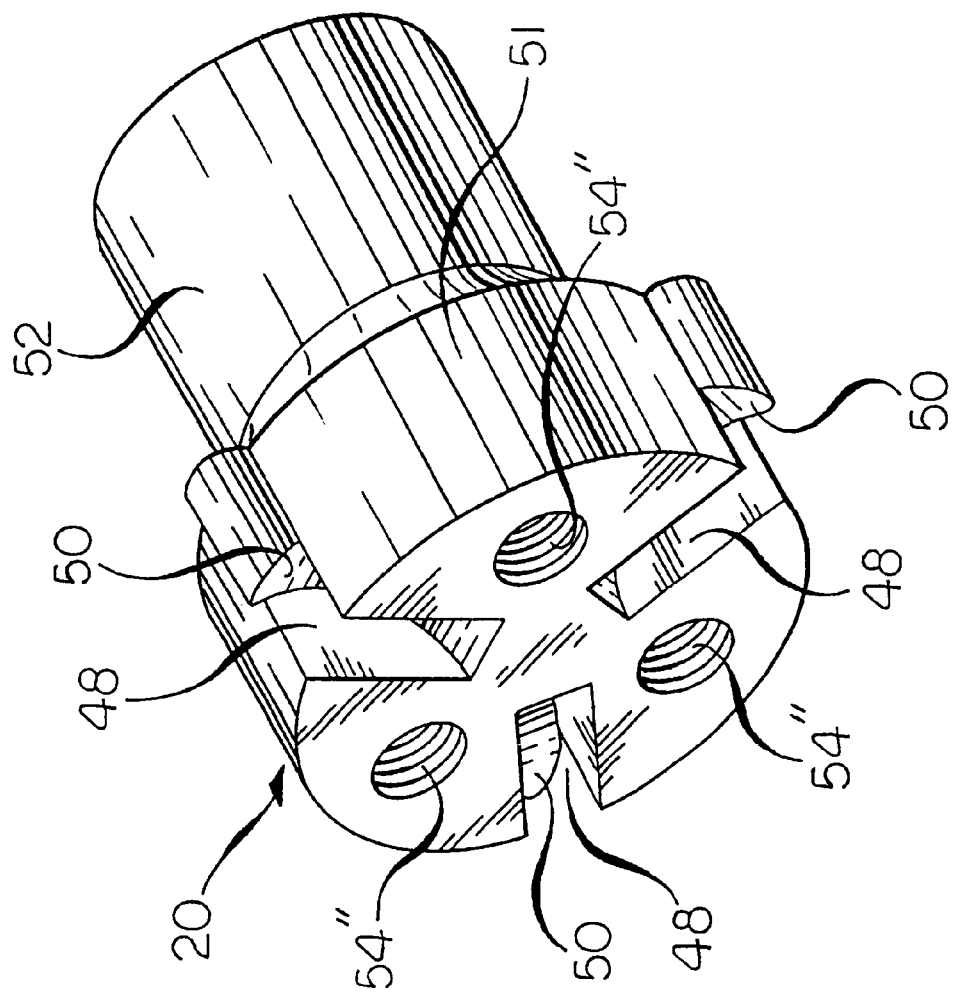
FIG. 10 is a perspective view of the second return end member according to the invention.

Similar to the first return end member 18, the second return end member 20 shown in FIG. 10 is generally cylindrical shaped having an outer diameter approximately equal to the outer diameter of the core member 16. The second return end member 20 includes one or more recesses or return race tracks 48 that correspond in number to the number of outer and inner race tracks 32 and 34 of the core member 16. Preferably, the return race tracks 48 are also complementary in cross sectional shape with the race tracks 26 of the outer race member 14 and with the outer and inner race tracks 32 and 34 of the core member 16. Each return race track 48 includes a concave end portion 50 that protrudes from the outer surface 51 of the second return end member 20 to facilitate the circumferential travel or recirculation of the ball bearings 22 around the outer and inner race tracks 32 and 34 of the core member 16. The second return end member 20 also includes an axially extending hollow shaft portion 52 extending outwardly therefrom. The purpose of the shaft portion 52 is described below. A plurality (three in the illustrated embodiment) of threaded bores 54" are formed through the second return end member 20 for a purpose that will be explained below.

The core member 16, first return end member 18 and second return end member 20 can be coupled together to form the inner race member 15 in many different ways. As shown in FIGS. 11 and 12, the core member 16 and the first and second return end members 18 and 20 include one or more threaded apertures 54 for allowing the core member 16 and the first and second return end members 18 and 20 to be coupled together by using a threaded fastener 56, such as a connecting rod, a bolt, and the like, that extend through the aligned through bores 54 and 54' formed respectively in the core member 16 and the first return end member 18 into engagement with the aligned threaded bores 54" formed in the second return end member 20. Alternatively, the core member 16 and the first and second return end members 18 and 20 can be secured together using any well known means in the art, such as brazing, welding, and the like. Furthermore, the core member 16 and the first and second return end members 18 and 20 can be formed as an integral unit from a single piece of material using well-known methods, such as sinter brazing powdered metal, and the like. Lastly, the core member 16 can be provided with one or more outwardly protruding key members (not shown) that cooperate with recessed areas (not shown) on the first and second return end members 18 and 20 to retain them together.

Once inserted into the outer race member 14, the inner race member 15 can slide very smoothly and with very low axial resistance in the axial direction relative to the outer race member 14. The precise conformance between the ball bearings 22 traveling on the race tracks 26 of the outer race member 14 and the outer race track 32 of the core member 15 allows torque to be transmitted through the ball bearings 22 while minimizing the adverse effects of backlash and broken back.

Referring back to FIGS. 1 and 2, the steering shaft assembly 10 further includes a first yoke, indicated generally at 58, that is secured to the outer race member 14 by using any well-known means, such as welding, brazing, and the like. Typically, the yoke 58 is adapted to be connected through a cross 60 to another yoke or similar device 61 so as to form a first universal joint assembly. Similarly, the steering shaft assembly 10 further includes a second yoke, indicated generally at 62, that is secured to a yoke shaft 63 (see FIG. 2) by using any well-known means, such as welding, brazing, and the like. The yoke shaft 63 has an outer diameter that is smaller than the inner diameter of the outer race member 14. One end of the yoke shaft 63 extends within and is secured to the hollow shaft portion 52 of the second end return member 20 by using any well-known means, such as welding, brazing, and the like. Typically, the yoke 62 is adapted to be connected through a cross 64 to another yoke or similar device 65 so as to form a second universal joint assembly.

A flexible convoluted boot 66 is provided as an exterior seal structure for the slip member 12. A first end 68 of the flexible boot 66 is secured to the outer race member 14, such as by a conventional band clamp 70. Similarly, a second end 72 of the flexible boot 66 is secured to the second yoke 62, such as by a conventional band clamp 74. The boot 66 prevents dirt, water, and other contaminants from entering into the slip member 12. During use, the outer and inner race members 14 and 15 may move axially relative to each other. When such relative axial movement occurs, the boot 66 will expand and contract axially to accommodate such movement, while continuing to provide the desired sealing action.

Figure 13:
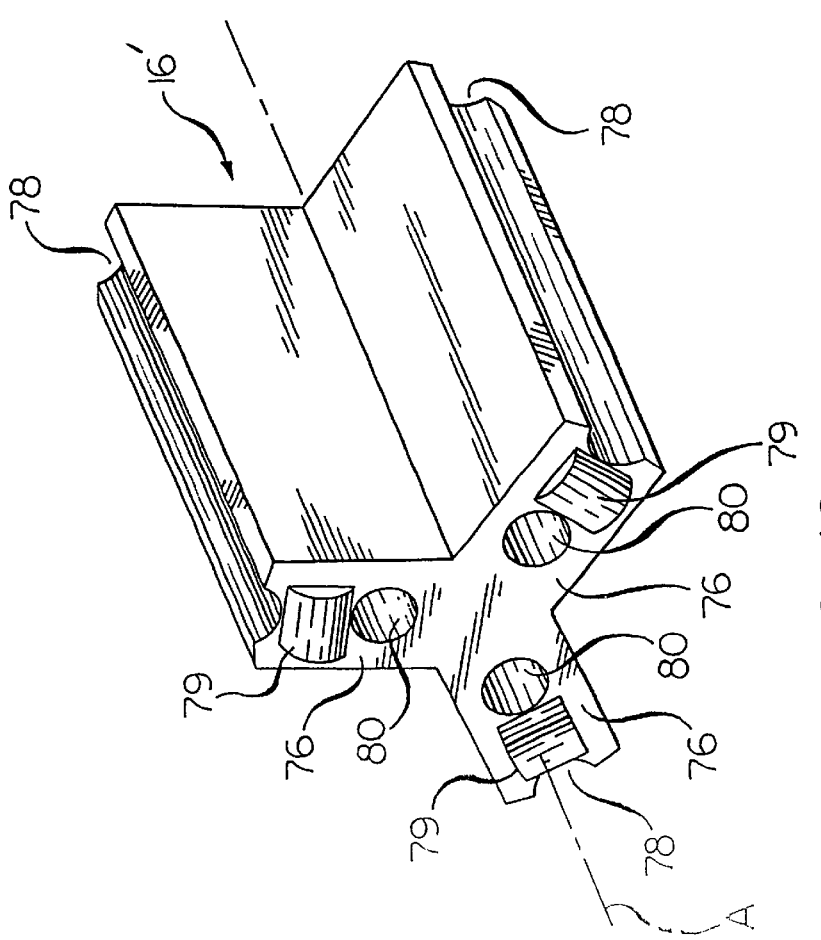
FIG. 13 is a perspective view of a first alternative embodiment of the core member according to the invention.

It will be appreciated that the invention is not limited by the cross-sectional shape of the inner race member 15. A first alternate embodiment of the core member is shown at 16' in FIG. 13. The core member 16' includes one or more projections or fingers 76 extending outwardly from the rotational axis, A, of the core member 16'. Each finger 76 includes an outer race track 78 and a radially aligned inner bore or inner race track 80 for allowing the ball bearings to recirculate as the slip member 12 is moved axially. The core member 16' also includes one or more ramps 79 one each end (only one end is shown in FIG. 13) of the core member 16'. The ramps 79 facilitate the recirculation of the ball bearings 22 between the outer and inner race tracks 78 and 80.

Preferably, the outer and inner race tracks 78 and 80 of the core member 16' are radially aligned with respect to a rotational axis, A, of the core member 16'. In other words, the inner race track 78 is offset by 0° from the load bearing outer race track 80 such that the ball bearings 22 transmit torque between the outer and inner race members 14 and 15. By contrast, the ball bearings 22 while traveling on the inner race tracks 80 do not transmit any torque between the outer and inner race members 14 and 15, but are able to freely move within the inner race tracks 80. Preferably, the load bearing portions of the outer and inner race tracks 78 and 80 are made of hardened metal. However, the non-load bearing portions of the inner race track 80 can be made of a different material, such as softer metal or thermoplastic material. It will be appreciated that the invention is not limited by the degree of offset of the outer and inner race tracks 78 and 80, and that the invention can be practiced with any desired degree of offset. In other words, the inner race track 80 can be at any offset angle with respect to the outer race track 78.

As shown in FIG. 13, the core member 16' includes three outwardly extending fingers 76 offset from each other by approximately 120°. However, it will be appreciated that the invention is not limited by the number of outwardly extending fingers 76, and that the invention can be practiced with any desired number of fingers. For example, the core member 16' can include four fingers 76 protruding outwardly from the central axis, A, and offset from each other by approximately 90° to form a cross-shaped configuration. In another example, the core member 16' can include five is fingers 76 outwardly protruding from the central axis, A, offset from each other by approximately 72° to form a star-shaped configuration.

Figure 15:
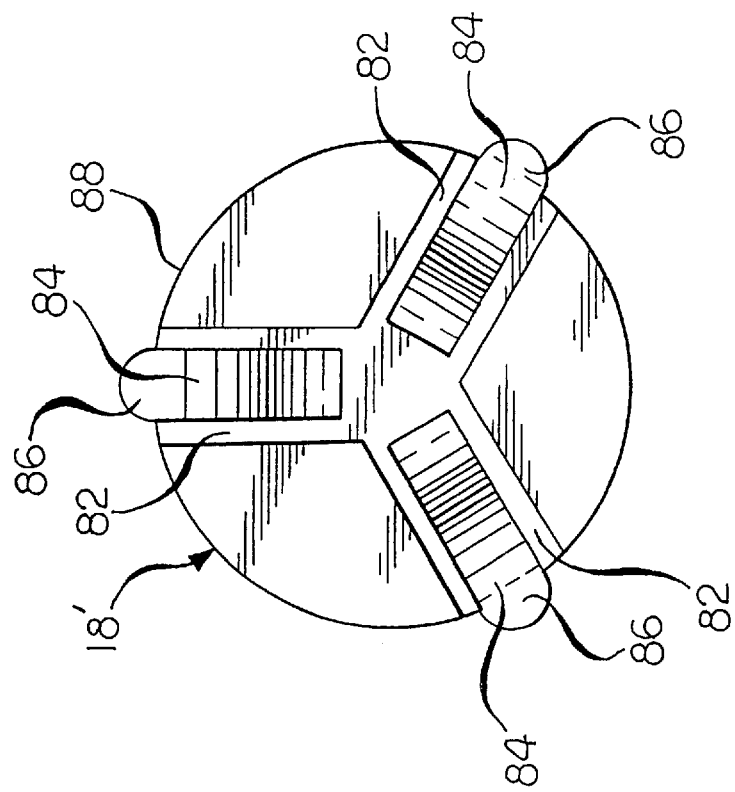
FIG. 15 is an end elevational view of the first alternative embodiment of the first return end member of FIG. 14.
Figure 14:
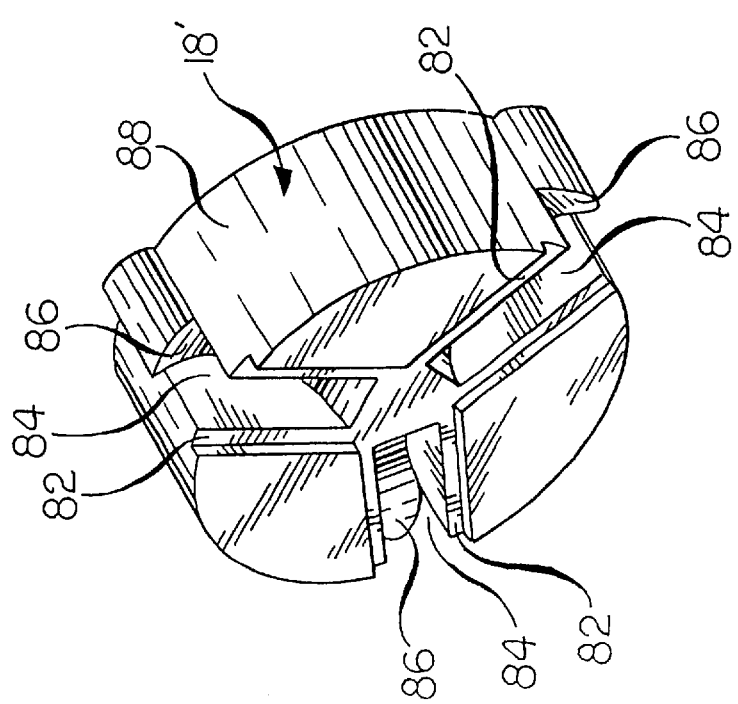
FIG. 14 is a perspective view of a first alternative embodiment of the first return end member according to the invention.

Referring now to FIGS. 14 and 15, an alternative embodiment of a first return end member 18' that can be used with the core member 16' is illustrated. The first return end member 18' includes one or more recessed areas 82 that correspond in 20 number to the fingers 76 of the core member 16'. The recessed areas 82 are of sufficient width to allow the fingers 76 of the core member 16' to be inserted therein. In this manner, the fingers 76 abut against the recessed areas 82 which also act as a key to properly position the core member 16' with respect to the first return end member 18'.

The first return end member 18' also includes one or more return race tracks 84 that correspond in number to the number of outer and inner race tracks 78 and 80 of the core member 16'. Preferably, the return race tracks 84 are complementary in cross sectional shape with the race tracks 26 of the outer race member 14 and with the outer and inner race tracks 78 and 80 of the core member 16'. Each of the return race tracks 84 include a first concave end portion 86 that protrudes from the outer surface 88 of the first return end member 18' to facilitate the circumferential travel of the ball bearings 22 between the outer and inner race tracks 78 and 80 of the core member 16'.

Figure 16:
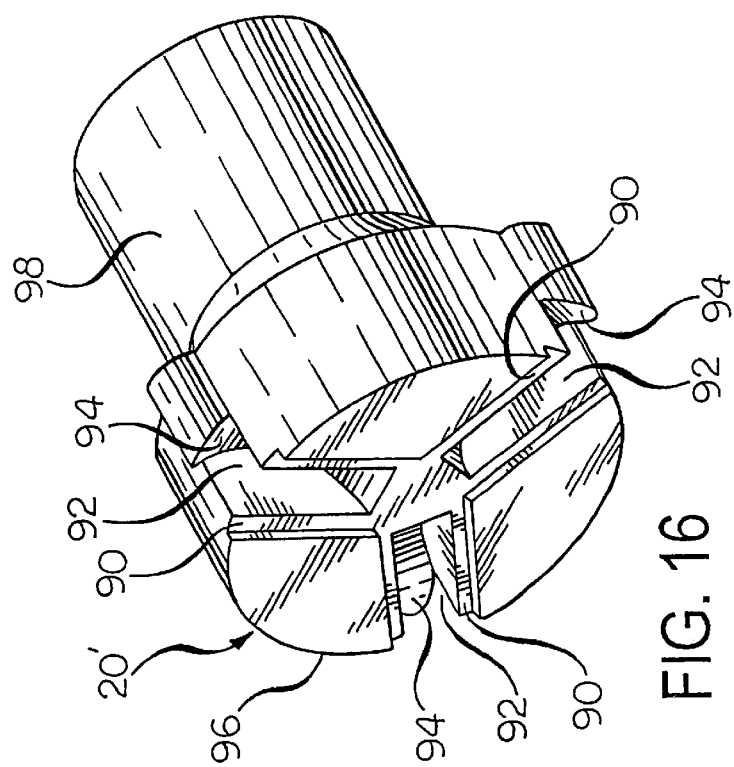
FIG. 16 is a perspective view of a first alternative embodiment of the second return end member according to the invention.

Referring now to FIG. 16, an alternative embodiment of a second return end member 20' that can be used with the core member 16' is illustrated. The second return end member 20' includes one or more recessed areas 90 that correspond in number to the fingers 76 of the core member 16'. The recessed areas 90 are of sufficient width to allow the fingers 76 of the core member 16' to be inserted therein. In this manner, the fingers 76 abut against the recessed areas 90 which also act as a key to properly position the core member 16' with respect to the second return end member 18'.

The second return end member 20' also includes one or more return race tracks 92 that correspond in number to the number of outer and inner race tracks 78 and 80 of the core member 16'. Preferably, the return race tracks 92 are complementary in cross sectional shape with the race tracks 26 of the outer race member 14 and with the outer and inner race tracks 78 and 80 of the core member 16'. Each of the return race tracks 84 include a second concave end portion 94 that protrudes from the outer surface 96 of the second return end member 20' to facilitate the circumferential travel of the ball bearings 22 between the outer and inner race tracks 78 and 80 of the core member 16'. The second return end member 20' also includes an axially extending hollow shaft portion 98 for securing the second return end member 20' to the yoke 58.

The core member 16' and the first and second return end members 18' and 20' may be secured to each other by using means well-known in the art, such as threaded fasteners, adhesives, and the like. For example, a threaded aperture (not shown) may be provided through the central portion of the core member 16' and first and second return end members 18' and 20' such that a threaded fastener can be inserted through the aperture to secure the core member 16' to the first and second return end members 18' and 20'.

Figures 17, 18:
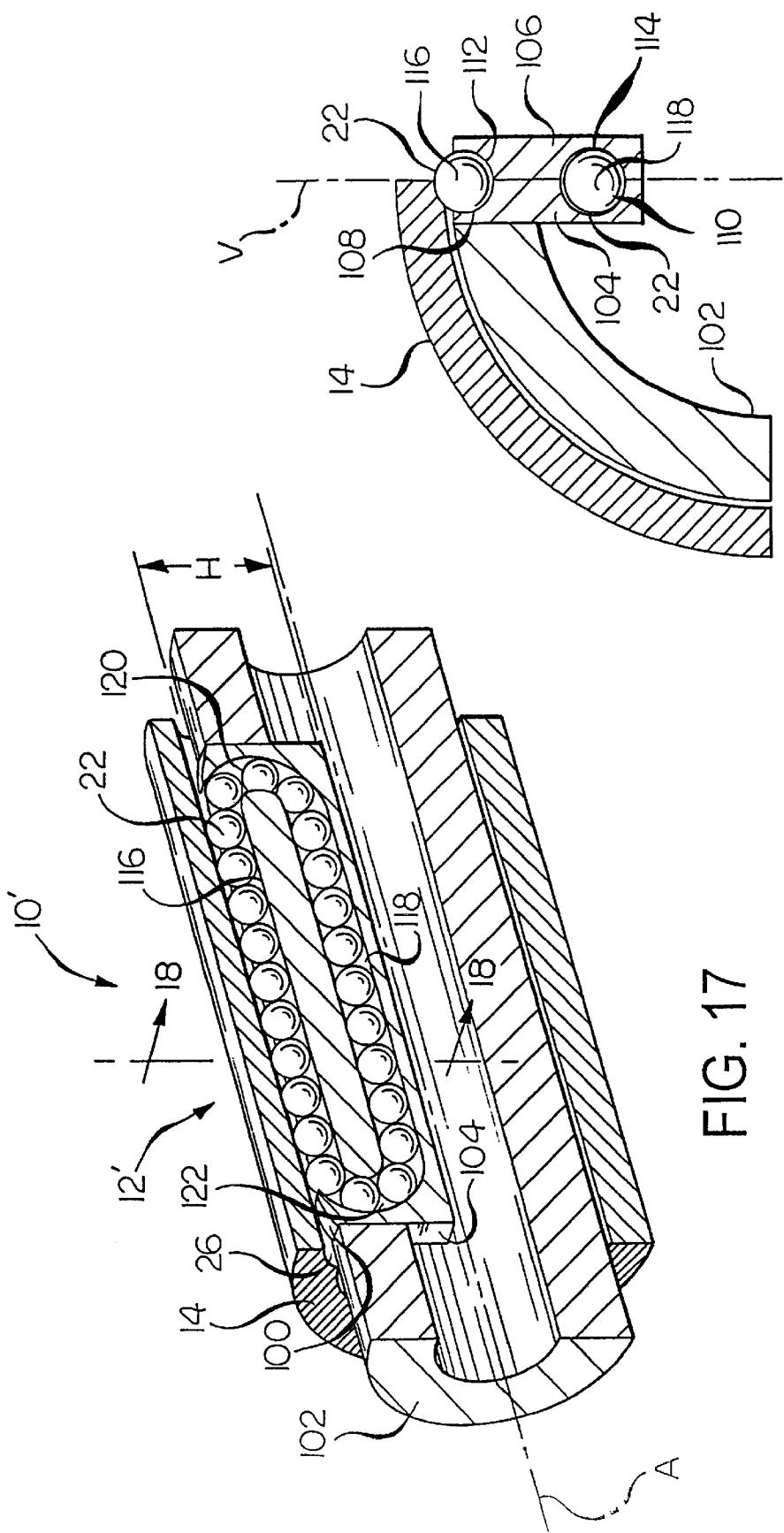
FIG. 17 is a perspective in cross section of a second alternate embodiment of a slip joint of the invention.
FIG. 18 is an enlarged cross sectional view of a portion of the second alternative embodiment of the slip joint taken along line 18—18 of FIG. 17.

Referring now to FIGS. 17 and 18, a second embodiment of a steering shaft assembly 10' is shown. This can be accomplished by forming the outer race member 14 by forming one or more grooves, and preferably two or more grooves in the outer race member 14 to define the outer race tracks 26. In addition, a corresponding number of slots 100 can be formed in a yoke tube 102 of the steering shaft assembly 10'. A pair of ball recirculating track members 104 and 106 are disposed within each slots 100 of the yoke tube 102 so as to define a ball recirculation path. Preferably, at least two of such ball recirculation paths are provided, similar to that described above.

It will be appreciated that the invention is not limited by the number of slots 100 formed in the yoke tube 102 and the corresponding number of pairs of ball recirculating track members 104 and 106 disposed therein, and that the invention can be practiced with any desired number of slots 100 and ball recirculating track members 104 and 106. For example, three pairs of ball recirculating track members 104 and 106 can be disposed within three slots 100, each slot 100 being offset from each other by approximately 120°. In another example, the invention can be practiced by forming four slots 100 in the yoke tube 102 that are offset from each other by approximately 90° and four corresponding pairs of ball recirculating track members 104 and 106 disposed therein. In yet another example, the invention can be practiced by forming five slots 100 in the yoke tube 102 that are offset from each other by approximately 72° and five corresponding pairs of ball recirculating track members 104 and 106 can be disposed therein. Each ball recirculating track member 104 and 106 can be made of hardened material, such as metal, and the like.

As best seen in FIG. 18, each ball recirculating track member 104 and 106 is mirror symmetric with each other about a vertical axis, V. The ball recirculating track member 104 includes a pair of recesses 108 and 110 formed therein. Similarly, the ball recirculating track member 106 includes a cooperating pair of recesses 112 and 114 formed therein. Preferably, the recesses 108, 110, 112 and 114 are complementary in cross-sectional shape. Because each ball recirculating track member 104 and 106 is mirror symmetric about the vertical axis, V, an outer ball recirculating race track 116, an inner ball recirculating race track 118, and a first and second end return race tracks 120 and 122 are formed by joining the ball recirculating track members 104 and 106 about the vertical axis, V. Similar to the ball recirculating race tracks 38 and 40, the ball recirculating race tracks 116 and 118 and the first and second end return race tracks 120 and 122 are of sufficient size as to allow the ball bearings 22 to engage the bottom of each ball recirculating race track 116, 118, 120 and 122. Alternatively, the ball recirculating race tracks 116 and 118 can be oval, elliptical, or other non-circular shape. If desired, the pair of ball recirculating track members 104 and 106 can be biased in the upward, vertical direction by a biasing device (not shown), such as a spring and the like, positioned underneath the pair of ball recirculating track members 104 and 106. In this case, the yoke tube 102 can be generally solid in cross section, rather than a hollow cylinder in cross section, in order to provide support the biasing device.

As best seen in FIG. 18, the inner race track 118 is substantially parallel to the outer race track 116, that is, radially offset by 0° from the outer race track 116. In other words, the outer and inner race tracks 116 and 118 are radially aligned with a rotational axis, A, of the yoke tube 102. However, it will be appreciated that the invention is not limited by the degree of offset between the outer and inner race tracks 116 and 118, and that the invention can be tangentially aligned with any desired degree of offset between the outer and inner race tracks 116 and 118. Preferably, the load bearing portions of the outer and inner race tracks 116 and 118 are made of hardened metal. However, the non-load bearing portions of the inner race track 118 can be made of a different material, such as softer metal or thermoplastic material. It will be appreciated that the pair of ball recirculating track members 104 and 106 can be integrally formed by using methods well-known in the art, such as sintering powdered metal, and the like.

FIGS. 19 and 20 show a third alternative embodiment of the inner race member or core member, shown generally at 16", capable of being disposed within the outer race member 14. In this embodiment, the core members 16 and 16' and the first and second end return members 18, 18', 20 and 20' of the earlier embodiments are replaced with the integrally formed core member 16" in which the outer and inner race tracks 132 and 134 are tangentially offset with respect to a rotational axis, A. The amount of offset can be up to 90° with respect to the rotational axis, A, of the core member 16". An axially extending shaft portion 136 is formed on one end of the core member 16" for securing to the yoke tube 63 by using any well-known means, such as welding, brazing, and the like. The tangential degree of offset of the core member 16" provides additional stability for the load bearing outer race track 132 when the ball bearings 22 transmit rotational torque between the outer race member 14 and the core member 16".

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A slip member, comprising:
   an outer race member including one or more race tracks;
   a yoke tube having at least one slot formed therein;
   a pair of ball recirculating track members disposed within the at least one slot, each ball recirculating track member including one or more recesses, the recesses forming an outer ball recirculating race track, an inner ball recirculating race track, and first and second end return race tracks; and
   one or more ball bearings disposed within one or the outer and inner ball recirculating race tracks.

2. The slip member according to claim 1, wherein the outer and inner ball recirculating race tracks are formed by joining the pair of ball recirculating track members about a vertical axis.

3. The slip member according to claim 1, wherein the one or more race tracks of the outer race member and the outer ball recirculating race track defined by the pair of ball recirculating track members transmit torque between the outer race member and the pair of ball recirculating track members through the one or more ball bearings.

4. The slip member according to claim 1, wherein the inner ball recirculating race track allows the one or more ball bearings to freely travel between the inner ball recirculating track and the outer ball recirculating track.

5. The slip member according to claim 1, wherein the inner and outer ball recirculating race tracks are radially aligned with respect a rotational axis of the yoke tube.

6. The slip member according to claim 2, wherein the inner and outer ball recirculating race tracks are tangentially aligned with respect to a rotational axis of the yoke tube.

7. The slip member according to claim 2, wherein the outer ball recirculating race track is complimentary in cross sectional shape to the inner ball recirculating race track.

8. A slip member comprising:
   an outer member having a race track provided therein;
   an inner member having a slot formed therein;
   at least one track member disposed within said slot, said track member having a ball recirculating track provided therein including a portion that is aligned with said race track provided in said outer member; and a plurality of balls disposed within said race track provided in said outer member and said ball recirculating track provided in said track member such that said outer member and said inner member are connected together for concurrent rotation and for axial movement relative to one another.

9. The slip member defined in claim 8 wherein said outer member has a plurality of race tracks provided therein; said inner member has a plurality of slots formed therein; a track member is disposed within each of said slots, each of said track members having a ball recirculating track provided therein including a portion that is aligned with an associated one of said plurality of race tracks provided in said outer member; and a plurality of balls is disposed within each associated pair of said race tracks provided in said outer member and said ball recirculating tracks provided in said track member.

10. The slip member defined in claim 9 wherein said plurality of race tracks provided in said outer member are equidistantly offset from one another.

11. The slip member defined in claim 8 wherein said track member has a recess provided therein that forms said ball recirculating track.

12. The slip member defined in claim 8 wherein a pair of track members are disposed within said slot, said track members cooperating with one another to define said ball recirculating track.

13. The slip member defined in claim 12 wherein each of said track members has a recess provided therein, said recesses cooperating with one another to define said ball recirculating track.

14. The slip member defined in claim 12 wherein said track members are radially symmetric.

15. The slip member defined in claim 8 wherein said race track formed in said outer member and said slot formed in said inner member are radially aligned with one another.

16. A steering shaft assembly comprising:

a first yoke;

a second yoke; and a slip member connected between said first and second yokes, said slip member including an outer member connected to said first yoke and having a race track provided therein; an inner member connected to said second yoke and having a slot formed therein; at least one track member disposed within said slot, said track member having a ball recirculating track provided therein including a portion that is aligned with said race track provided in said outer member; and a plurality of balls disposed within said race track provided in said outer member and said ball recirculating track provided in said track member such that said first and second yokes are connected together for concurrent rotation and for axial movement relative to one another.

17. The steering shaft assembly defined in claim 16 wherein said outer member has a plurality of race tracks provided therein; said inner member has a plurality of slots formed therein; a track member is disposed within each of said slots, each of said track members having a ball recirculating track provided therein including a portion that is aligned with an associated one of said plurality of race tracks provided in said outer member; and a plurality of balls is disposed within each associated pair of said race tracks provided in said outer member and said ball recirculating tracks provided in said track member.

18. The steering shaft assembly defined in claim 16 wherein said plurality of race tracks provided in said outer member are equidistantly offset from one another.

19. The steering shaft assembly defined in claim 16 wherein said track member has a recess provided therein that forms said ball recirculating track.

20. The steering shaft assembly defined in claim 16 wherein a pair of track members are disposed within said slot, said track members cooperating with one another to define said ball recirculating track.

21. The steering shaft assembly defined in claim 20 wherein each of said track members has a recess provided therein, said recesses cooperating with one another to define said ball recirculating track.

22. The steering shaft assembly defined in claim 20 wherein said track members are radially symmetric.

23. The steering shaft assembly defined in claim 16 wherein said race track formed in said outer member and said slot formed in said inner member are radially aligned with one another.

* * * * *